March 12, 1957
R. G. BENNETTSON
2,785,000
MEANS FOR CLOSING THE WINDOW RECEIVING
SLOT IN AN AUTOMOBILE DOOR SILL
Filed May 3, 1956
2 Sheets-Sheet 1
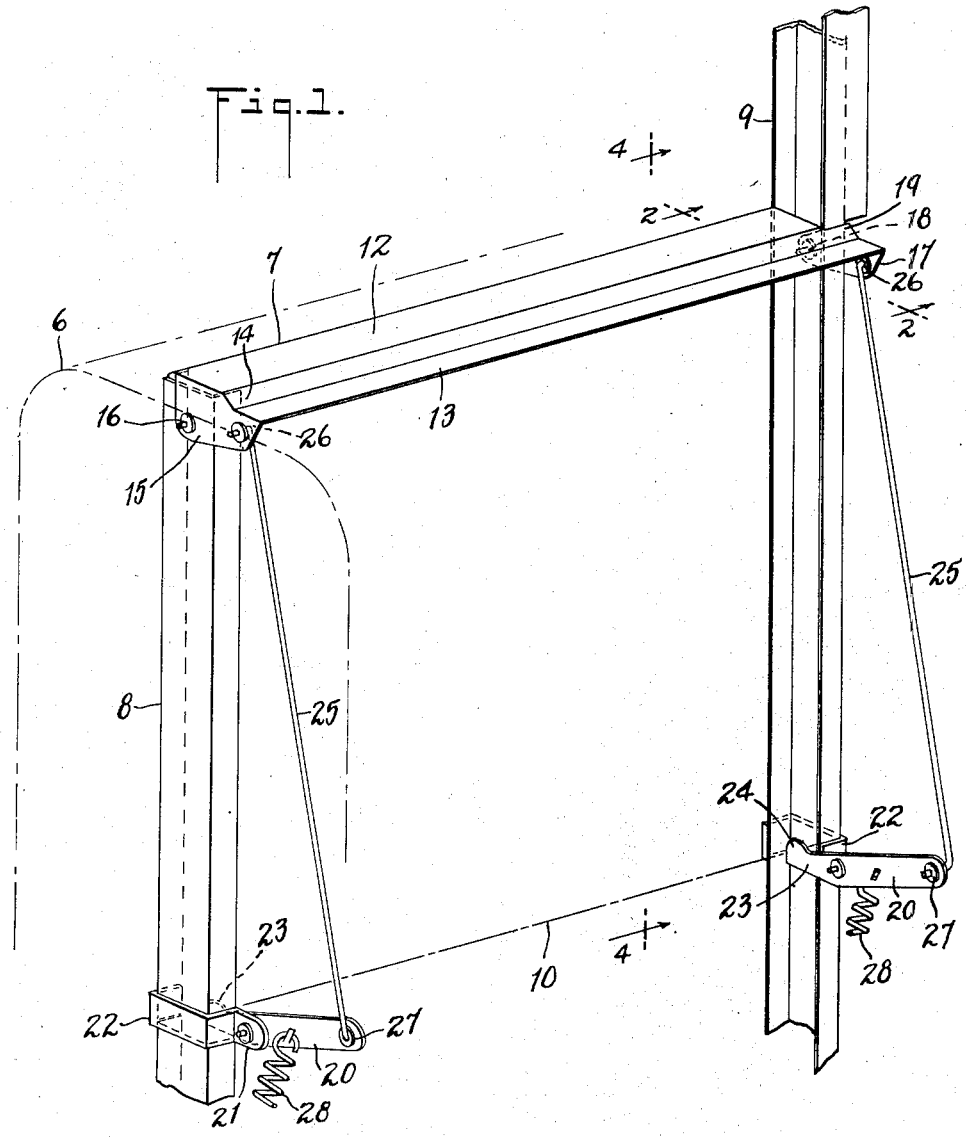
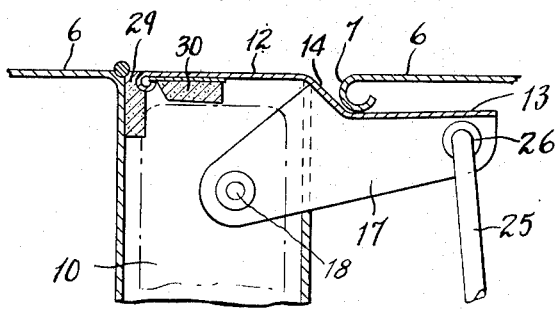
INVENTOR.
RAYMOND G. BENNETTSON
BY John A. Seifert
ATTORNEY March 12, 1957
R. G. BENNETTSON
2,785,000
MEANS FOR CLOSING THE WINDOW RECEIVING
SLOT IN AN AUTOMOBILE DOOR SILL
Filed May 3, 1956
2 Sheets-Sheet 2
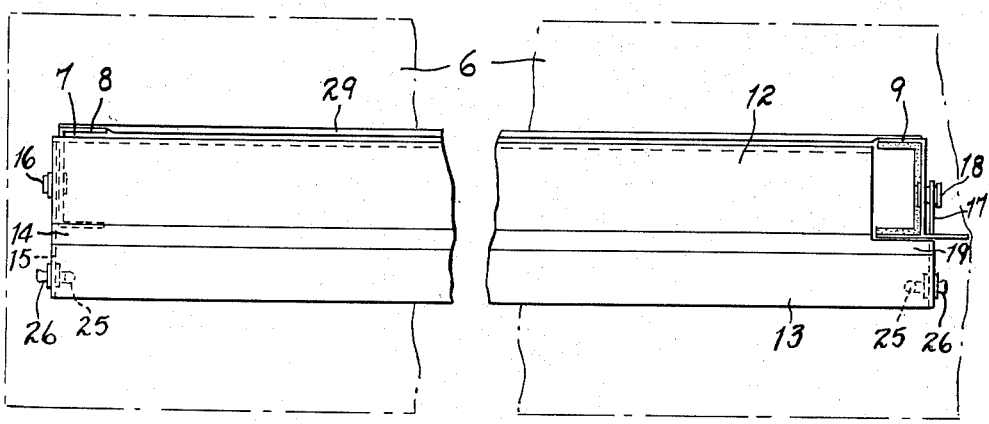
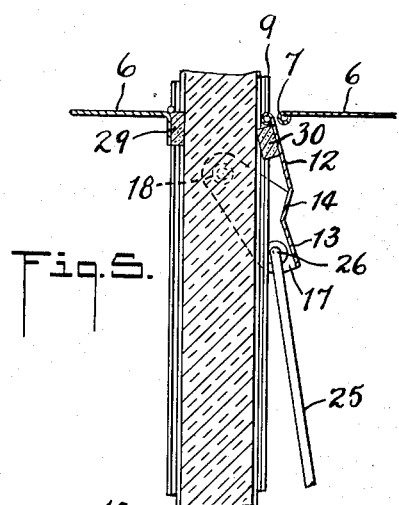
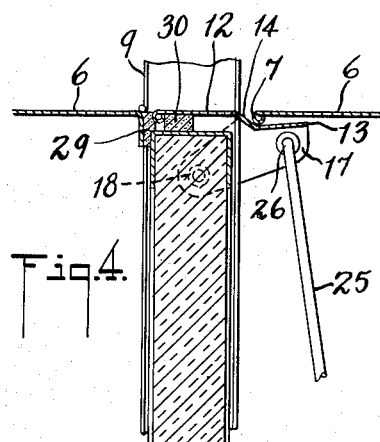
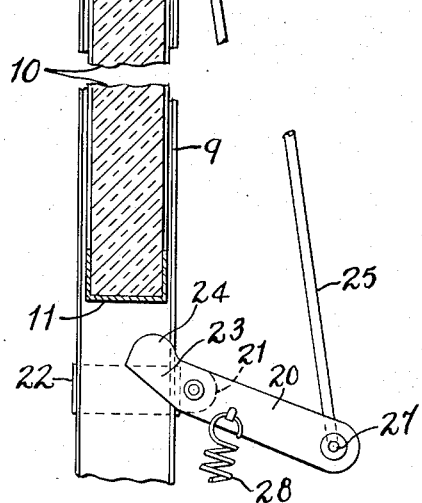
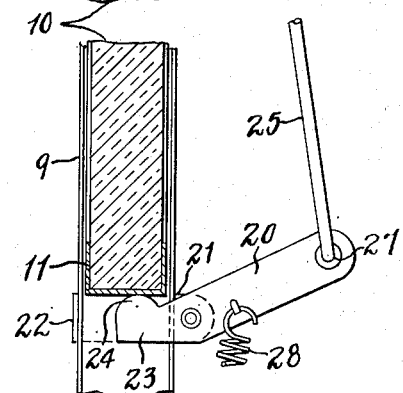
INVENTOR.
RAYMOND G. BENNETTSON
BY John A. Seifert
ATTORNEY United States Patent Office 2,785,000
Patented Mar. 12, 1957

2,785,000
MEANS FOR CLOSING THE WINDOW RECEIVING SLOT IN AN AUTOMOBILE DOOR SILL

Raymond G. Bennettson, Plainview, N. Y.

Application May 3, 1956, Serial No. 582,531

12 Claims. (Cl. 296—44)

This invention relates to means for closing the slot in an automobile door or panel when the window of the door or panel is completely retracted within the door or panel whereby said means form an armrest flush with the edges of the slot when the window is in fully retracted position and prevent foreign articles from dropping into the slot which will impede the proper operation of the window and cause rattles.

It has been found that one of the objections to automobiles of the type known as "hardtops" is that due to the width of the doors and panels of said type of automobiles, foreign articles may be accidentally dropped into the spaces between the sides of the slots and the windows when the windows are fully retracted into the doors or panels.

It is an object of this invention to provide means which are fully retracted within an automobile door or panel when the window of the door or panel extends to any extent above the door or panel and are moved to snugly close the slot when the window is fully retracted within the door or panel.

It is another object of the invention to provide means to snugly close the slot of an automombile door or panel which are yieldingly urged to a position within the door or panel when part of the window extends above the door or panel and are actuated by the window reaching its lowermost position within the door or panel.

Other objects and advantages of the invention will be set forth in the detailed description of the invention.

In the drawings accompanying and forming a part of this application:

Figure 1 is a perspective view of the embodiment of the invention in combination with an automobile door shown partly in outline and guideways for the window shown in full lines and broken-away with a closure plate of the invention shown in window slot closing position;

Figure 2 is a fragmentary sectional view, on an enlarged scale, taken on the line 2—2 of Figure 1 looking in the direction of the arrows;

Figure 3 is a top plan view of the closure plate in slot closing position;

Figure 4 is a vertical-sectional view, on an enlarged scale, taken on the line 4—4 of Figure 1 looking in the direction of the arrows; and Figure 5 is a view similar to Figure 4 showing the window in a raised position permitting the closure plate to be actuated out of slot closing position to a position within the door.

The embodiment of the invention is shown in combination with an automobile door 6 shown in outline in Figures 1 and 3 and in full lines in Figure 2, 4 and 5, and arranged with a longitudinal slot 7 in the top wall to permit access to the interior of the door which is of hollow construction. At the rear end of the slot 7, there is provided a guideway 8 extending from the top wall of the door 6 into the hollow interior of the door. At the front end of the slot 7, there is provided a guideway 9 extending both upwardly from the top of the door and downwardly into the interior of the door, as shown in Figures 1, 4 and 5. A window 10 is slidably mounted in the guideways 8 and 9, and actuated into and out of the slot 7 by suitable mechanism, not shown. The edges of the window are mounted in a metal frame, as shown at 11 in Figures 4 and 5. The guideway 9 is extended above the door 6 to support the front edge of the window and provide mounting means for a vent window, not shown.

When the window 10 is fully retracted into the door 6, the slot is open and foreign articles may be accidentally dropped into the spaces between the faces of the window and the sides of the slot and which articles may damage the window actuating mechanism and cause rattles. The open slot will also present an uneven surface which is not suitable as an armrest.

The present invention overcomes the disadvantages of the open slot when the window 10 is fully retracted into the door 6 by providing means to close said open slot immediately upon the full retraction of the window. This means comprises a closure plate having one longitudinal margin portion 12 corresponding substantially to the size and shape of the slot 7 and the other longitudinal margin portion 13 of the closure plate is offset from the longitudinal margin portion 12 by a center longitudinal portion 14 extending at obtuse angles to the margin portions 12 and 13. The width of the margin portion 12 is approximately equal to the combined widths of the portions 13 and 14. The rear ends of the closure plate portions 12, 13 and 14 are provided with an ear 15 pivotally mounted by a pin 16 on the exterior of the guideway 8 and within the door 6. The front ends of the closure plate portions 13 and 14 are provided with an ear 17 pivotally mounted by a pin 18 on the exterior of the guideway 9 in horizontal alignment with the pin 16. To pivotally mount the ear 17 on the exterior of the guideway 9, it is necessary to extend the front end sections of the closure plate portions 13 and 14 beyond the front end of the closure plate portion 12 so that said closure plate portions 13 and 14 extend along the side of the guideway 9, as shown at 19 in Figures 1 and 3. Part of the closure plate portion 14 and the entire closure plate portion 12 terminate at the guideway 9, as shown in Figures 1 and 3. The pins 16 and 18 are located on one side of the longitudinal or vertical axes of the guideways 8 and 9, or the longitudinal or vertical axis of the window 10, so that the closure plate moves in an arcuate path from a substantially vertical position entirely within the door 6, as shown in Figure 5, to a substantially horizontal position, as shown in Figures 1, 2, 3 and 4, with the closure plate portions 12 and 14 closing the slot 7 flush with the edges of the slot and the closure plate portion 13 remaining within the door 6.

The operating mechanism for the closure plate comprises a pair of levers 20, each lever being of obtuse angle shape pivotally mounted at the angle portion on an ear 21 extending from one leg of a U-shaped bracket 22 clamped to the exteriors of the guideways 8 and 9 adjacent to the bottom of the window in its fully retracted position. The ears 21 position the levers 20 to extend in vertical planes between the guideways 8 and 9, so that one end portion 23 of each lever 20 extends into the path of travel of the window 10. Said end portion 23 is provided with a lobe 24 to be engaged by the bottom frame member 11 of the window 10. The end of each lever 20 opposite the lobe 24 is operatively connected to either of the ears 15 and 17 by a rod or link 25 having one end pivotally connected to the ear, as at 26, and the other end pivotally connected to the opposite end of the lever 20, as at 27.

The closure plate is normally actuated to the substantially vertical position and the lobes 24 are positioned in a horizontal plane above the lowermost position of the bottom of the window 10 by springs 28 anchored at one end to a stationary part, such as the guideways or door structure, not shown, and the opposite end of each spring is connected to a lever 20 between the ear 21 and the link pivot 27, as shown in Figure 1.

When the window 10 is in any adjusted position other than its fully retracted position, the bottom of the window or the bottom window frame member 11 is out of engagement with the lobes 24 whereby the springs 28 will lower the ends of the levers 20 connected to the links 25 and thereby move the closure plate entirely within the door, as shown in Figure 5.

When the window 10 is fully retracted within the door 6, the bottom frame member 11 of the window will engage and lower the lobes 24 thereby raising the opposite ends of the levers 20 and moving the closure plate to substantially horizontal position with the plate portions 12 and 14 closing the slot 7 against the force of the springs 28.

To prevent rattling of and damage to the window, one side of the slot 7 is provided with a strip of resilient material, such as felt, as shown at 29, to engage one face of the window. The other face of the window is engaged by a strip of resilient material, such as felt, carried on the underface of the closure plate portion 12, as shown at 30 in Figure 5. Said strip 30 will engage the top of the window when the window is fully retracted and the slot 7 is closed by the closure plate portions 12 and 14, as shown in Figures 2 and 4.

The closure plate 12—14 is also mounted to close the slots in the panels arranged with windows retracted within the panel by a rotary movement.

Having thus described my invention, I claim:

1. Means for closing the slot in an automobile door when a window is completely retracted within the door, comprising a closure plate pivotally mounted inside the door and below the slot to have movement in an arcuate path from a position within the door to a position closing the slot, a lever pivotally mounted inside the door and adjacent to the bottom of the window in fully retracted position and having an end portion extending into the path of travel of the window to engage the bottom of the window and the opposite end portion of the lever being operatively connected to the closure plate, and a spring to yieldingly position the end portion of the lever extending into the path of travel of the window above the lowermost position of the bottom of the window and yieldingly position the end portion of the lever operatively connected to the closure to move the closure plate to its position within the door, whereby actuation of the window to fully retracted position moving the lever against the force of the spring to effect positioning of the closure plate to close the door slot.

2. Means for closing the slot in an automobile door when a window is completely retracted within the door as claimed in claim 1, wherein the spring is connected to the end portion of the lever operatively connected to the closure plate.

3. Means for closing the slot in an automobile door when a window is completely retracted within the door as claimed in claim 1, wherein the closure plate is arranged with a strip of resilient material to engage a face of the window when the plate is positioned within the door and to engage the top of the window when the closure plate is positioned to close the door slot.

4. Means for closing the slot in an automobile door when a window is completely retracted within the door as claimed in claim 1, wherein the end portion of the lever extending into the path of travel of the window extends at an obtuse angle to the end portion of the lever operatively connected to the closure plate and the lever is pivotally mounted at said angle.

5. Means for closing the slot in an automobile door when a window is completely retracted within the door as claimed in claim 1, wherein the lever is pivotally mounted at an intermediate portion of the lever, and the spring is connected to the lever between said pivotal mounting and the operative connection between the lever and the closure plate.

6. Means for closing the slot in an automobile door when a window is completely retracted within the door as claimed in claim 1, wherein the closure plate is pivotally mounted on one side of the longitudinal center of the window.

7. Means for closing the slot in an automobile door when a window is completely retracted within the door as claimed in claim 1, wherein the lever is operatively connected to the closure plate by a link pivotally connected at its ends to said lever and the closure plate.

8. Means for closing the slot in an automobile door when a window is completely retracted within the door, comprising a closure plate of a width greater than the width of the door slot and arranged with opposite longitudinal margin portions offset relative to each other, a center longitudinal portion extending obliquely to said margin portions and ears depending from the ends of the closure plate and pivotally mounted within the door to provide movement to the plate in an arcuate path from a substantially vertical position entirely within the door to a substantially horizontal position with one offset margin portion and the center portion of the plate closing the slot and the other margin portion of the plate within the door, a pair of levers pivotally mounted within the door and adjacent to the bottom of the window in fully retracted position, each lever having an end portion extending into the path of travel of the window to engage the bottom of the window and the other end portion of the lever operatively connected to an ear of the closure plate, and a spring to yieldingly position the end portion of each lever extending into the path of travel of the window above the lowermost position of the bottom of the window and yieldingly position the end portion of each lever operatively connected to an ear of the closure plate to move the closure plate to its substantially vertical position entirely within the door, whereby actuation of the window to fully retracted position moving the levers against the force of the spring to effect positioning of the closure plate to its substantially horizontal position with one margin portion and the center portion of the plate closing the door slot.

9. Means for closing the slot in an automobile door when a window is completely retracted within the door as claimed in claim 8, wherein the center longitudinal portion of the closure plate extends at obtuse angles to the longitudinal margin portions of the closure plate.

10. Means for closing the slot in an automobile door when a window is completely retracted within the door including opposed guideways at the ends of the slot and slidably supporting the window, comprising a closure plate of a width greater than the width of the door slot and arranged with opposite longitudinal margin portions offset relative to each other, a center longitudinal portion extending obliquely to said margin portions and ears depending from the ends of the closure plate and pivotally mounted on the guideways to provide movement to the closure plate in an arcuate path from a substantially vertical position entirely within the door to a substantially horizontal position with one offset margin portion and the center portion of the plate closing the slot and the other margin portion of the plate within the door, a pair of levers, each lever being pivotally supported by a guideway adjacent to the bottom of the window in fully retracted position and having an end portion extending into the path of travel of the window to engage the bottom of the window and the other end portion of the lever operatively connected to an ear of the closure plate, and a spring to yieldingly position the end portion of each lever extending into the path of travel of the window above the lowermost position of the bottom of the window and yieldingly position the end portion of each lever operatively connected to an ear of the closure plate to move the closure plate to its substantially vertical position entirely within the door, whereby actuation of the window to fully retracted position moving the levers against the force of the spring to effect positioning of the closure plate to its substantially horizontal position with one margin portion and the center portion of the plate closing the door slot.

11. Means for closing the slot in an automobile door when a window is completely retracted within the door including opposed guideways at the ends of the slot and slidably supporting the window as claimed in claim 10, wherein the ears of the closure plate are pivotally mounted on the exteriors of the guideways.

12. Means for closing the slot in an automobile door when a window is completely retracted within the door including opposed guideways at the ends of the slot and slidably supporting the window as claimed in claim 11, wherein one of the guideways extend above the door, and the longitudinal margin portion and part of the center portion of the closure plate closing the window slot is shorter than the other longitudinal margin portion and the remaining part of the center portion of the closure plate whereby said first longitudinal margin portion and part of the center portion of the closure plate terminate at the guideway extending above the door and the other longitudinal margin portion and the remaining part of the center portion extend beyond the guideway for pivotally mounting the adjacent ear on the exterior of said guideway.

References Cited in the file of this patent

UNITED STATES PATENTS

| | | |
|---|---|---|
| 1,393,192 | Baker | Oct. 11, 1921 |
| 2,206,334 | Rosner | July 2, 1940 |
| 2,690,350 | Shapiro | Sept. 28, 1954 |
| 2,718,428 | Jacques et al. | Sept. 20, 1955 |